(12) United States Patent
Barkan

(10) Patent No.: US 7,644,865 B2
(45) Date of Patent: Jan. 12, 2010

(54) IMAGING READER WITH VARIABLE RANGE

(75) Inventor: Edward Barkan, Miller Place, NY (US)

(73) Assignee: Symbol Technologies, Inc, Holtsville, NY (US)

( * ) Notice: Subject to any disclaimer, the term of this patent is extended or adjusted under 35 U.S.C. 154(b) by 0 days.

(21) Appl. No.: 11/513,714

(22) Filed: Aug. 31, 2006

(65) Prior Publication Data

US 2008/0054075 A1    Mar. 6, 2008

(51) Int. Cl.
G03B 7/08        (2006.01)
(52) U.S. Cl. .......................... 235/462.24; 235/462.16; 235/462.07
(58) Field of Classification Search ............ 235/462.15, 235/462.22, 462.01, 454, 472.01, 462.07, 235/462.16, 462.24
See application file for complete search history.

(56) References Cited

U.S. PATENT DOCUMENTS 4,939,356 A * 7/1990 Rando et al. ............. 235/462.2
5,324,924 A * 6/1994 Cai et al. ................ 235/462.15
5,962,838 A * 10/1999 Tamburrini ............ 235/462.45
5,992,751 A * 11/1999 Laser ..................... 235/472.01
6,189,793 B1 * 2/2001 Knowles et al. ........ 235/462.22
6,678,598 B1 * 1/2004 Hillebrand et al. ............ 701/45

OTHER PUBLICATIONS

International Preliminary Report on Patentability and Written Opinion of the International Searching Authority for International Application PCTUS2007/017692 mailed Mar. 12, 2009.

* cited by examiner

*Primary Examiner*—Michael G Lee
*Assistant Examiner*—Rafferty Kelly

(57) ABSTRACT

A solid-state imager in a reader for electro-optically reading indicia located in a range of working distances includes an array of image sensors for capturing light from the indicia over a field of view during the reading. The range of working distances in which the indicia are read is varied, either automatically or manually.

5 Claims, 3 Drawing Sheets

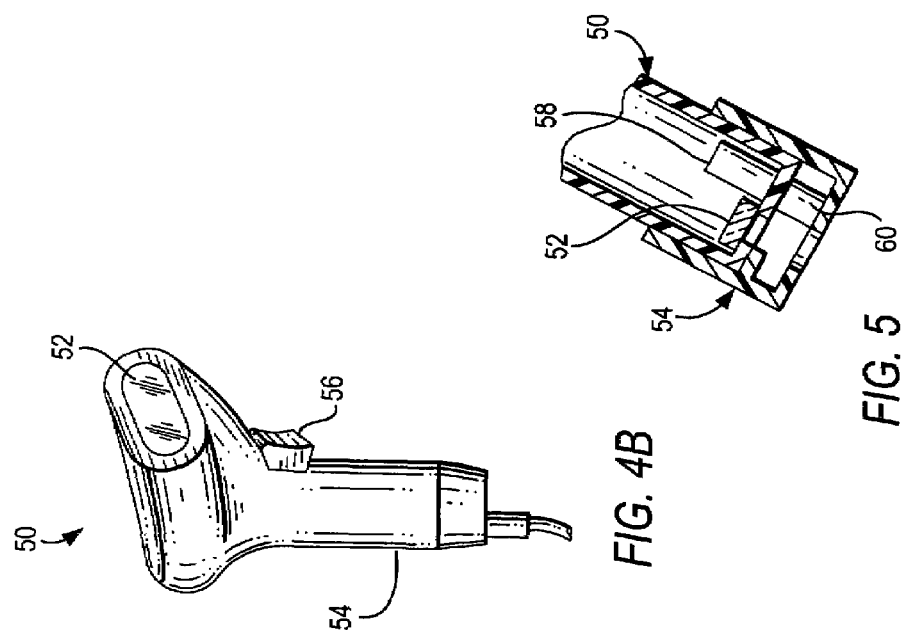
FIG. 5
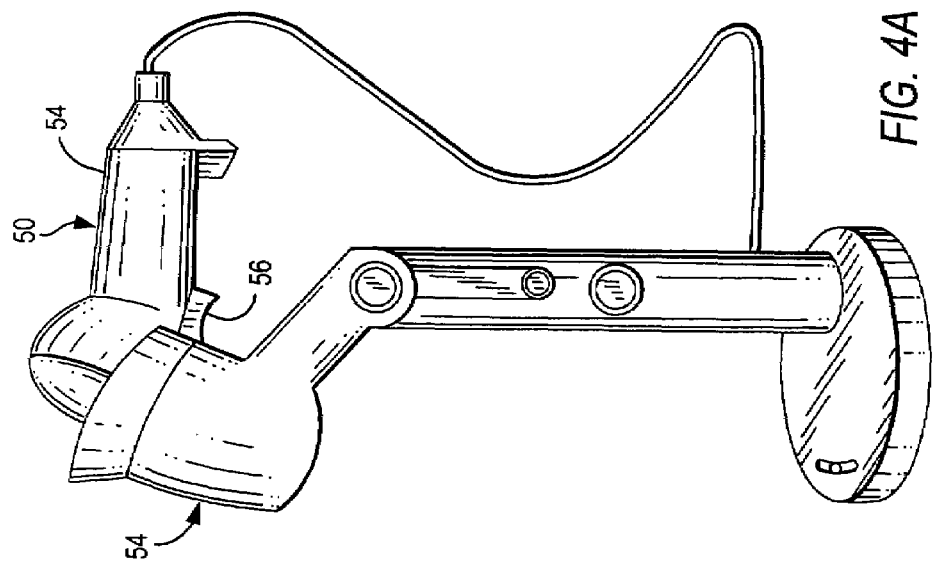
FIG. 4B
FIG. 4A

IMAGING READER WITH VARIABLE RANGE

DESCRIPTION OF THE RELATED ART

Flat bed laser readers, also known as horizontal slot scanners, have been used to electro-optically read one-dimensional bar code symbols, particularly of the Universal Product Code (UPC) type, at a point-of-transaction workstation in supermarkets, warehouse clubs, department stores, and other kinds of retailers for many years. As exemplified by U.S. Pat. No. 5,059,779; No. 5,124,539 and No. 5,200,599, a single, horizontal window is set flush with, and built into, a horizontal countertop of the workstation. Products to be purchased bear an identifying symbol and are typically slid or swiped across the horizontal window through which a multitude of scan lines is projected in a generally upwards direction. When at least one of the scan lines sweeps over a symbol associated with a product, the symbol is processed and read.

The multitude of scan lines is generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the horizontal window as a scan pattern of the scan lines.

Instead of, or in addition to, a horizontal slot scanner, it is known to provide a vertical slot scanner which is typically a portable reader placed on the countertop such that its window is generally vertical and faces an operator at the workstation. The generally vertical window is oriented generally perpendicularly to the horizontal window, or is slightly rearwardly inclined. The scan pattern generator within the workstation also projects the multitude of scan lines in a generally outward direction through the vertical window toward the operator. The generator for the vertical window can be the same as or different from the generator for the horizontal window. The operator slides or swipes the products past either window from right to left, or from left to right, in a "swipe" mode. Alternatively, the operator merely presents the symbol on the product to the center of either window in a "presentation" mode. Further alternatively, the operator may pick up the portable reader to scan large and/or heavy objects that cannot be easily positioned on the countertop in front of the reader. The choice depends on operator preference or on the layout of the workstation. The symbol must be located within a range of working distances relative to the generally vertical window in order to be successfully read.

These point-of-transaction workstations have been used for processing transactions involving products associated with one-dimensional symbols each having a row of bars and spaces spaced apart along one direction, and for processing two-dimensional symbols, such as Code 49, as well. Code 49 introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

Both one- and two-dimensional symbols can also be read by employing solid-state imagers. For example, an image sensor device may be employed which has a one- or two-dimensional array of cells or photosensors which correspond to image elements or pixels in a field of view of the device. The array captures light from the symbol. Such an image sensor device may include a one- or two-dimensional charge coupled device (CCD) or a complementary metal oxide semiconductor (CMOS) device and associated circuits for producing electronic signals corresponding to a one- or two-dimensional array of pixel information for a field of view.

When such imaging readers are placed on a countertop in a restricted space, symbols on nearby items that are not to be transacted, but still within the range of working distances, might be accidentally read. When such imaging readers are picked up to read a symbol on a product that cannot be easily placed on the countertop, a fixed range of working distances sufficient to read close-in symbols on the countertop might be insufficient to read far-out symbols located off the countertop.

SUMMARY OF THE INVENTION

One feature of the present invention resides, briefly stated, in a reader for electro-optically reading indicia, such as one- or two-dimensional symbols, located in a range of working distances relative to the reader. The reader includes a housing having a window and could be operated in a workstation mode in which the reader rests directly on a support surface, or in a stand resting on the support surface, and is stationary during reading, or in a handheld mode in which the reader is held in an operator's hand. During reading, in the case of the workstation mode, the symbol is swiped past the window and, in the case of the handheld mode, the reader itself is moved relative to and aimed at the symbol. In the preferred embodiment, the reader is used in a retail establishment, such as a supermarket.

A one- or two-dimensional, solid-state imager is mounted in the housing, and includes an array of image sensors operative for capturing light from a one- or two-dimensional symbol through the window over a field of view during the reading. Preferably, the array is a CCD or a CMOS array. The imager is preferably associated with a high-speed strobe illuminator to enable the image of the symbol to be acquired in a very short period of time, for example, on the order of 500 microseconds, so that the symbol image is not blurred even if there is relative motion between the imager and the symbol. The strobe illumination is preferably brighter than ambient illumination, especially close to the window.

In accordance with this invention, the range of working distances of the imaging reader is varied. For example, if the imaging reader is placed on a countertop in a restricted space, then the working distance range is advantageously reduced to prevent symbols on nearby items that are not to be transacted from being accidentally read. If the imaging reader is picked up from the countertop to read a symbol on a product that cannot be easily placed on the countertop, then the working distance range is advantageously increased to read the symbol on the remote product, and is advantageously decreased when the reader is returned to the countertop. If a stand is used, then a reduced working distance range is advantageously employed when the reader is mounted in the stand, and an increased working distance range is advantageously employed when the reader is held in the operator's hand.

The change in the working distance range can be accomplished automatically or manually. For example, if the stand is used, then controls can be employed on the reader and the stand in order to detect the presence or absence of the reader in the stand and to vary the working distance range accordingly. Such controls may include a magnet and an associated magnetic sensor such as a reed switch or a Hall effect sensor. An optical sensor or a mechanical switch could also be used. The range can also be changed by sending a command from a host computer to the reader, or by scanning a special purpose symbol that reconfigures the reader.

Range can further be controlled by measuring the apparent size of a symbol after it has been scanned and decoded, but not yet reported to the host computer. Apparent size of the symbol is an indication of the distance to the symbol. A far-out symbol located further away from the reader looks smaller to the reader than a close-in symbol. If a scanned and decoded symbol is smaller than a predetermined size, then the symbol is considered to be a far-out symbol, and the reader can, for example, be programmed not to report this far-out symbol to the host computer, thereby effectively reducing the working distance range by only allowing close-in symbols to be read. The apparent size of the symbol can be determined by counting how many pixels wide an entire symbol is, or how many pixels wide some portion of the symbol is. This symbol portion can be a single block of a UPC/EAN code, or a bar, or a bar and space combination. The bar/space combination is advantageous because this measurement is immune to bar width growth or shrinkage. Range can not only be varied by measuring the apparent size of the symbol, but can also be varied by moving an imaging lens in front of the array.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 4A is a perspective view of still another embodiment of a portable electro-optical reader operative in a workstation mode in accordance with this invention;

FIG. 4B is a perspective view of the embodiment of FIG. 4A in a hand-held mode in accordance with this invention; and FIG. 5 is a broken-away view of a detail of the embodiment of FIG. 4A.

DETAILED DESCRIPTION OF THE PREFERRED EMBODIMENTS

Figure 1:
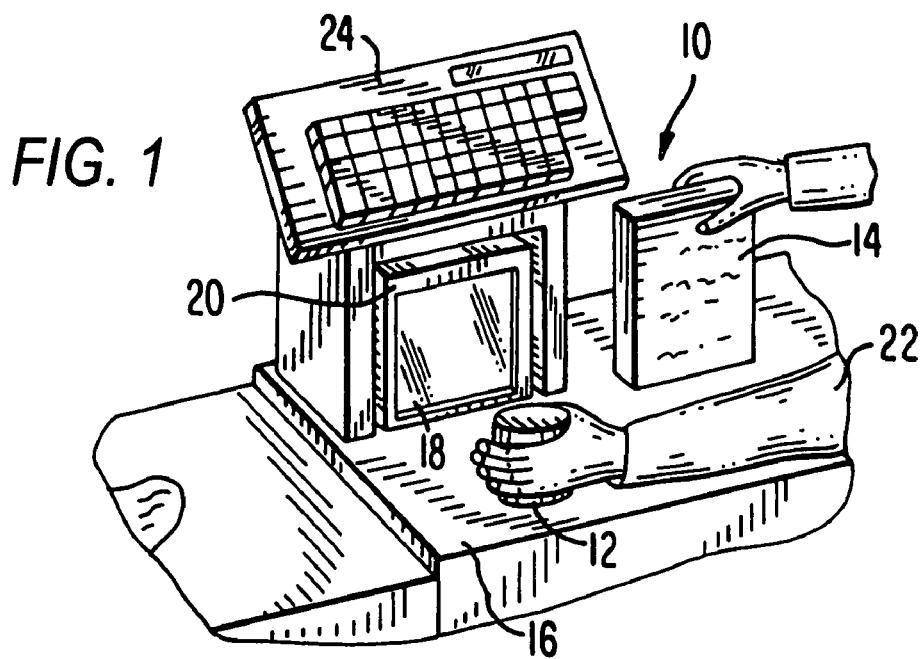
FIG. 1 is a perspective view of one embodiment of a portable electro-optical reader operative in either a hand-held mode, or in the illustrated workstation mode, in accordance with this invention.

Reference numeral 10 in FIG. 1 generally identifies an electro-optical reader in a workstation mode for processing transactions and mounted on a checkout counter at a retail site at which products, such as a can 12 or a box 14, each bearing a target symbol, are processed for purchase. The counter includes a countertop 16 across which the products are slid at a swipe speed past a generally vertical window 18 of a box-shaped vertical slot reader 20 mounted on the countertop 16. A checkout clerk or operator 22 is located at one side of the countertop, and the reader 20 is located at the opposite side. A cash/credit register 24 is located within easy reach of the operator. The reader 20 is portable and lightweight and may be picked up from the countertop 16 by the operator 22, and the window 18 may be aimed at a symbol preferably on a product too heavy or too large to be easily positioned on the countertop in front of the reader in the workstation mode.

Figure 2:
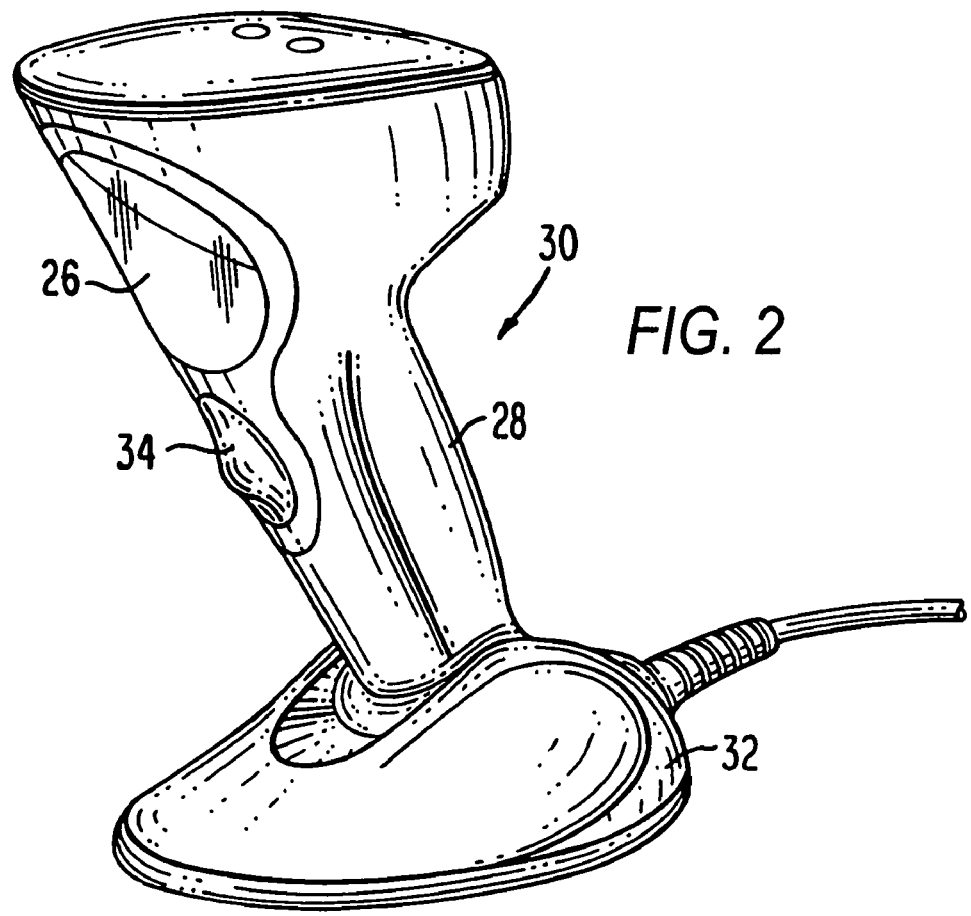
FIG. 2 is a perspective view of another embodiment of a portable electro-optical reader operative in either a hand-held mode, or in the illustrated workstation mode, in accordance with this invention.

Reference numeral 30 in FIG. 2 generally identifies another portable, electro-optical reader having a different configuration from that of reader 20. Reader 30 also has a generally vertical window 26 and a gun-shaped housing 28 supported by a base 32 for directly supporting the reader 30 on a countertop. The reader 30 can thus be used as a stationary workstation in which products are slid or swiped past the generally vertical window 26, or can be picked up off the countertop and held in the operator's hand and used as a handheld reader in which a trigger 34 is manually depressed to initiate reading of the symbol.

Reference numeral 50 in FIGS. 4A, 4B generally identifies another portable, electro-optical reader having yet another operational configuration from that of readers 20, 30. Reader 50 has a generally vertical window 52 and a gun-shaped housing 54 and is supported in a workstation mode (FIG. 4A) by a stand 54 on a countertop. The reader 50 can thus be used as a stationary workstation in which products are slid or swiped past the generally vertical window 26, or can be picked up off the countertop and held in the operator's hand in a handheld mode (FIG. 4B) and used as a handheld reader in which a trigger 56 is manually depressed to initiate reading of the symbol.

Figure 3:
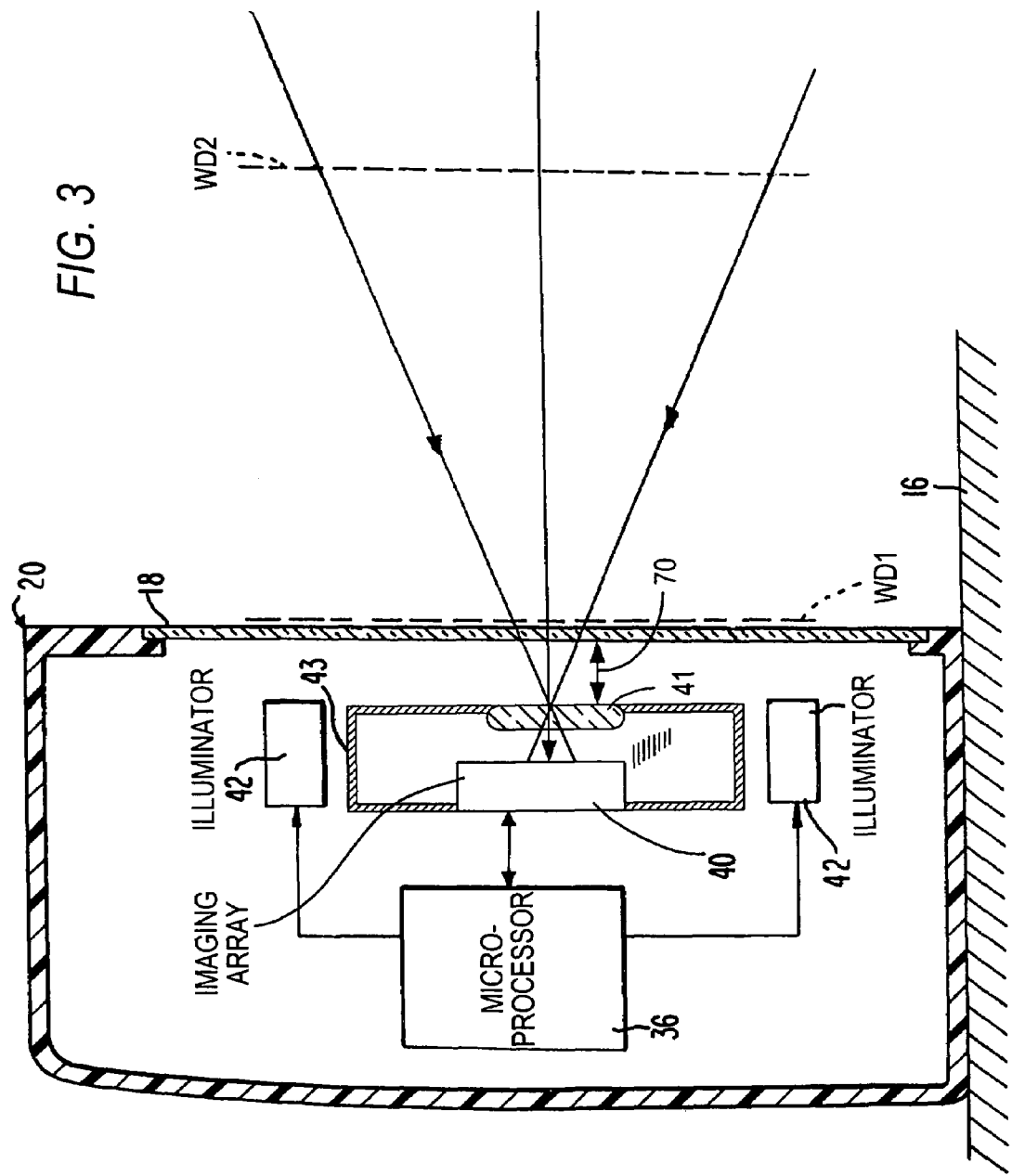
FIG. 3 is a block circuit diagram of various components of the embodiment of FIG. 1 in the workstation mode and schematically depicting a range of working distances.

Each reader 20, 30, 50 includes, as shown for representative reader 20 in FIG. 3, an imager 40 and a focusing lens 41 that are mounted in an enclosure 43. The imager 40 is a solid-state device, for example, a CCD or a CMOS imager and has a linear or area array of addressable image sensors operative for capturing light through the window 18 from a target, for example, a one- or two-dimensional symbol, over a field of view and located in a working range of distances between a close-in working distance (WD1) and a far-out working distance (WD2). In a preferred embodiment, WD1 is about two inches from the imager array 40 and generally coincides with the window 18, and WD2 is about eight inches from the window 18. An illuminator 42 is also mounted in the reader and preferably includes a plurality of light sources, e.g., light emitting diodes (LEDs) 42, arranged around the imager 40 to uniformly illuminate the target symbol.

As shown in FIG. 3, the imager 40 and the illuminator 42 are operatively connected to a controller or microprocessor 36 operative for controlling the operation of these components. Preferably, the microprocessor is the same as the one used for decoding light scattered from the indicia and for processing the captured target symbol images.

In operation, the microprocessor 36 sends a command signal to the illuminator 42 to pulse the LEDs for a short time period of 500 microseconds or less, and energizes the imager 40 to collect light from a target symbol substantially only during said time period. A typical array needs about 33 milliseconds to read the entire target image and operates at a frame rate of about 30 frames per second. The array may have on the order of one million addressable image sensors.

The imager 40 itself should have a global electronic shutter in which all the sensors are simultaneously exposed for light capture. Most CCD arrays are designed with a global electronic shutter. A typical CMOS array is designed with a rolling electronic shutter in which different sensors are exposed at different times. If a CMOS array is used, then it must be designed to allow a global electronic shutter.

In accordance with this invention, the range of working distances of the imaging reader is varied. For example, if the imaging reader is placed on the countertop 16 in a restricted space, then the working distance range is advantageously reduced to prevent symbols on nearby items that are not to be transacted from being accidentally read. If the imaging reader is picked up from the countertop 16 to read a symbol on a product that cannot be easily placed on the countertop, then the working distance range is advantageously increased to read the symbol on the remote product, and is advantageously decreased when the reader is returned to the countertop. If the stand 54 is used, then a reduced working distance range is advantageously employed when the reader 50 is mounted in the stand 54, and an increased working distance range is advantageously employed when the reader 50 is held in the operator's hand 22.

The change in the working distance range can be accomplished automatically or manually. For example, if the stand 54 is used, then controls 58, 60 (see FIG. 5) can be employed on the reader and the stand in order to detect the presence or absence of the reader 50 in the stand 54 and to vary the working distance range accordingly. Such controls 58, 60 may include a magnet and an associated magnetic sensor such as a reed switch or a Hall effect sensor. An optical sensor or a mechanical switch could also be used. The range can also be changed by sending a command from a host computer to the microprocessor 36, or by scanning a special purpose symbol that reconfigures and reprograms the microprocessor.

Range can further be controlled by measuring the apparent size of a symbol after it has been scanned and decoded, but not yet reported to the host computer. Apparent size of the symbol is an indication of the distance to the symbol. A far-out symbol located further away from the reader looks smaller to the reader than a close-in symbol. If a scanned and decoded symbol is smaller than a predetermined size, then the symbol is considered to be a far-out symbol, and the reader can, for example, be programmed not to report this far-out symbol to the host computer, thereby effectively reducing the working distance range by only allowing close-in symbols to be read. The apparent size of the symbol can be determined by counting how many pixels wide an entire symbol is, or how many pixels wide some portion of the symbol is. This symbol portion can be a single block of a UPC/EAN code, or a bar, or a bar and space combination. The bar/space combination is advantageous because this measurement is immune to bar width growth or shrinkage. Range can not only be varied by measuring the apparent size of the symbol, but can also be varied by moving an imaging lens (see FIG. 3 in which movement of the imaging lens 41 relative to the array 40 is indicated by a double-headed arrow 70) in front of the array.

In the case of an area imaging array 40 having mutually orthogonal linear rows and linear columns, provision is made to measure apparent size even when the symbol is angularly turned relative to the rows and columns. The orientation of the symbol is determined by the microprocessor 36. For example, if the symbol is rotated by 45 degrees relative to the rows and columns, then the measured symbol feature, e.g., the width of a bar, will look wider because it covers more pixels. The pixel count is therefore adjusted by the microprocessor by a factor that is determined by the angle of orientation.

It will be understood that each of the elements described above, or two or more together, also may find a useful application in other types of constructions differing from the types described above. Thus, readers having different configurations can be used.

While the invention has been illustrated and described as varying the working distance range in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A reader for electro-optically reading indicia located in a range of working distances relative to the reader, comprising:
    a housing having a window;
    a solid-state imager in the housing and including an array of image sensors for capturing light through the window from the indicia over a field of view during the reading;
    range control means for varying the range of working distances in which the indicia are read, wherein the range control means includes means for measuring a size characteristic of the indicia, and is operative for reducing the range of working distances when the size measured by the measuring means is below a predetermined range of reference sizes; and
    wherein the indicia is a bar code symbol comprised of bars and spaces having widths as considered along a scan direction lengthwise of the symbol, and wherein the measuring means is operative for measuring the width of at least one bar in an image by counting number of pixels in the image of the at least one bar.

2. The reader of claim 1, and a movable imaging lens for focusing the captured light onto the imager, and wherein the range control means is operative for varying the range of working distances by moving the imaging lens.

3. The reader of claim 1, wherein the imager is one of a charge coupled device and a complementary metal oxide silicon device having a global electronic shutter.

4. A method of electro-optically reading indicia located in a range of working distances, comprising the steps of:
    capturing light through a window of a reader from the indicia over a field of view during the reading by an array of image sensors;
    varying the range of working distances in which the indicia are read, wherein the varying step is performed by measuring a size characteristic of the indicia, and by reducing the range of working distances when the size measured is below a predetermined range of reference sizes; and
    wherein the indicia is a bar code symbol comprised of bars and spaces having widths as considered along a scan direction lengthwise of the symbol, and wherein the measuring step is performed by measuring the width of at least one bar in an image by counting number of pixels in the image of the at least one bar.

5. The method of claim 4, wherein the varying step is performed by varying the range of working distances by moving an imaging lens operative for focusing the captured light onto the image sensors.

* * * * *